(12) United States Patent
Scrima et al.

(10) Patent No.: US 12,033,772 B2
(45) Date of Patent: Jul. 9, 2024

(54) FLAME RETARDANT ELECTRICAL CABLE

(71) Applicants: PRYSMIAN S.P.A., Milan (IT); POLITECNICO DI MILANO, Milan (IT)

(72) Inventors: Vito Scrima, Milan (IT); Luigi Caimi, Milan (IT); Massimo Gola, Milan (IT); Attilio Citterio, Milan (IT)

(73) Assignees: Prysmian S.P.A., Milan (IT); Politecnico di Milano, Milan (IT)

( * ) Notice: Subject to any disclaimer, the term of this patent is extended or adjusted under 35 U.S.C. 154(b) by 870 days.

(21) Appl. No.: 17/049,684

(22) PCT Filed: Apr. 26, 2018

(86) PCT No.: PCT/EP2018/060664
§ 371 (c)(1),
(2) Date: Oct. 22, 2020

(87) PCT Pub. No.: WO2019/206412
PCT Pub. Date: Oct. 31, 2019

(65) Prior Publication Data
US 2021/0241940 A1     Aug. 5, 2021

(51) Int. Cl.
*H01B 7/295* (2006.01)
*C08F 10/02* (2006.01)
(Continued)

(52) U.S. Cl.
CPC ............. *H01B 7/295* (2013.01); *C08F 10/02* (2013.01); *C08K 3/041* (2017.05); *C08K 3/36* (2013.01); *B82Y 40/00* (2013.01)

(58) Field of Classification Search
CPC .......... H01B 7/295; B82Y 40/00; C08K 3/36; C08K 3/041; C08F 10/02
(Continued)

(56) References Cited

U.S. PATENT DOCUMENTS

| 2011/0240335 A1 | 10/2011 | Redondo |
| 2015/0274927 A1 | 10/2015 | Hara |
| 2020/0143960 A1* | 5/2020 | Jung ................. H01B 3/002 |

FOREIGN PATENT DOCUMENTS

| CN | 105367965 A | 3/2016 |
| WO | WO-2006094250 | 9/2006 |

OTHER PUBLICATIONS

International Search Report issued Jun. 11, 2018 in PCT/EP2018/060664, 4 pages.

* cited by examiner

*Primary Examiner* — Tremesha S Willis
(74) *Attorney, Agent, or Firm* — Element IP, PLC

(57) ABSTRACT

Disclosed herein are flame-retardant electric cables (10) having a core containing an electric conductor (11) and an electrically insulating layer (12) made from a flame-retardant polyolefin-based composition including a) a cross-linked polyolefin as base polymer, b) silica, and c) carbon nanotubes, wherein the amount of silica is from 5 wt % to 10 wt % of the polyolefin-based composition, and the amount of carbon nanotubes is from 0.5 wt % to 2 wt % of the polyolefin-based composition. Such cables have improved flame retardant performances, especially regarding a lower occurrence of droplets during burning, which render them capable of being certified in higher classes of the current international standards, for example of the standard EN 50399:2011/A1 (2016).

11 Claims, 1 Drawing Sheet

(51) Int. Cl.
*C08K 3/04* (2006.01)
*C08K 3/36* (2006.01)
*B82Y 40/00* (2011.01)

(58) Field of Classification Search
USPC .................................................. 174/110 SR
See application file for complete search history.

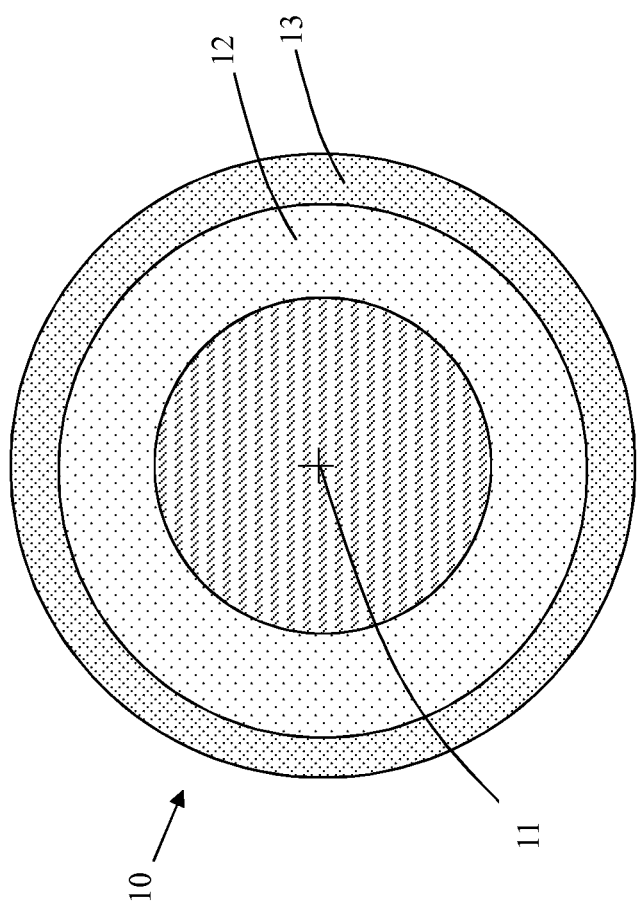

FLAME RETARDANT ELECTRICAL CABLE

FIELD OF APPLICATION

The present disclosure relates to a flame retardant electrical cable.

In particular, the present disclosure relates to a flame retardant electrical cable which exhibits reduced dripping (occurrence of droplets) from its plastic coverings when exposed to flame temperatures, e.g. in case of fire.

The cable according to the disclosure can be used particularly for low-voltage (LV) applications.

PRIOR ART

An important requirement for electric cables in presence of fire is the capacity of preventing flame and smoke propagation, as specified, for example, in standard IEC 60332-3-24 (2000)), especially in houses or, more generally, in premises where persons reside. Particularly, cables protected with fire resistant or flame-retardant layers are suitable for the strictest safety requirements in the case of fire, such as: emergency lightings, alarms and automatic fire detection systems, activation of smoke outlets or shutters, fans, air conditioning, and telephone and video surveillance systems.

The flame retardancy of an electric cable can be evaluated for compliance with and certified by national and/or international standards.

It is known that some standards, particularly international standards, require more and more stringent about the performance required to a flame-retardant cable to the end of improving the safety in buildings in case of fire.

A significant role in the performance of a cable in case of fire is played by the plastic coverings, for example by the electric insulation which is usually the thickest one. In particular, an important aspect of the flame-retardant performance of a cable is related to the possible occurrence of droplets when the electrical cable is exposed to flame temperatures, due to the melting of the plastic material forming the electric insulation or other coverings of the cable, and, when droplets are generated, to their amounts and to time span until the droplets end burning.

The newly introduced Construction Product Regulation (CPR, 2016) of the European Union provides a classification of the fire performance of construction products, such as cables, including occurrence of droplets under fire according to the standard EN 50399:2011/A1 (2016). Specifically, the cable is classified according to the above standard as:
  d0: No burning droplets or particles within 1,200 s;
  d1: No burning droplets or particles persisting longer than 10 s within 1,200 s;
  d2: none of the above.

Currently, many flame-retardant cables exhibit a behaviour, particularly relating to droplets occurrence while burning, such as they can obtain certification only in lower classes of current international standards, for example EN 50399:2011/A1 (2016), or may even not comply with some of them.

One method for reducing dripping under fire of flame-retardant cables is to use special polymers (e.g. olefin polymers treated with phosphorous-based compositions) in the manufacture of the electrical insulation of the cable. However, the use of those special polymers results in a significant increase of the production costs of the cable.

US 2006/0068201 discloses polymeric compositions which have useful fire-resistant properties and which may be used in electric cables. In particular, an insulating layer for providing a fire-resistant ceramic under fire conditions comprises:
  at least 15% by weight based on the total weight of the composition of a polymer base composition comprising at least 50% by weight of an organic polymer;
  at least 15% by weight based on the total weight of the composition of a silicate mineral filler; and
  at least one source of fluxing oxide which is optionally present in said silicate mineral filler,
  wherein after exposure to an elevated temperature experienced under fire conditions, a fluxing oxide is present in an amount of from 1 to 15% by weight of the residue.

The composition can be used for providing fire-resistant insulation for electric cables.

US 2008/0251273 discloses a plenum cable component with excellent fire-retardant properties prepared from a polyolefin-based composition comprising an olefin polymer and a metal hydroxide being surface treated with a phosphorous-based composition. The plenum cable component can be an insulation layer. Polymers of ethylene and vinyl silanes may be used as olefin polymer. In particular, a moisture cross-linkable composition can be obtained by using a polyethylene grafted with a vinylsilane. The polyolefin-based composition may contain other flame-retardants including silica, carbon nanotubes and talc.

SUMMARY OF THE DISCLOSURE

An object of the present disclosure is providing a flame-retardant electric cable, in particular a flame-retardant electric cable for low-voltage applications, having reduced dripping (occurrence of droplets) or no dripping when exposed to flame temperatures, such as those involved in a fire, so as to meet the requirements for certification according to the current international standards, for example the standard EN 50399:2011/A1 (2016), in a class as high as possible.

A flame-retardant electric cable as above which should also show good mechanical properties and workability as well as suitable dielectric properties of its insulating coating.

The Applicant found that an electric cable has improved flame retardant properties, particularly a reduced dripping under fire, when its conductors are coated with an insulating coating made from a flame-retardant polyolefin-based composition comprising a cross-linked polyolefin as base polymer and a balanced combination of silica and carbon nanotubes.

Accordingly, the present disclosure relates to a flame-retardant electric cable having a core comprising an electric conductor and an electrically insulating coating made from a flame-retardant polyolefin-based composition comprising:
  a) a cross-linked polyolefin as base polymer;
  b) silica; and
  c) carbon nanotubes,
wherein the amount of silica is from 5 wt % to 10 wt % of the polyolefin-based composition, and the amount of carbon nanotubes is from 0.5 wt % to 2 wt % of the polyolefin-based composition.

In an embodiment, the polyolefin-based composition for the cable insulating layer of the disclosure further comprises talc.

In another embodiment, the polyolefin-based composition for the cable insulating layer of the disclosure further comprises talc and graphene.

The Applicant found that a cable provided with an insulating coating made from a flame-retardant composition as specified above has improved flame-retardant properties, especially regarding a lower dripping or even absence of dripping during burning, which render the cable of the disclosure capable of being certified in high classes of the current international standards, for example of the Commission Delegated Regulation (EU) 2016/364 of 1 Jul. 2015. In addition, it has been found that the provision of an insulating coating made from the flame-retardant polyolefin-based composition as specified above allows to impart improved flame-retardant properties to the cable without impairing its mechanical and dielectric properties as well as workability of the insulating layer for example through conventional extrusion techniques.

DETAILED DESCRIPTION

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein. In addition, unless indicated otherwise, all percentages referred to components of the flame-retardant polyolefin-based composition used for obtaining the insulation coating of the cable according to the disclosure are to be understood as percentages by weight on the total weight of the composition.

The cable according to the disclosure can be used particularly for low-voltage (LV) applications.

In the present description and claims, as low voltage (LV) cable it is meant a voltage of less than about 1 kV.

The cable of the present disclosure is suitable to transport electric current for energy and for telecommunication.

In FIG. 1, a cable 10 according to the disclosure is shown. Cable 10 has a core comprising a conductor 11 which is an element of elongate shape made of an electrically conductive material, e.g. aluminium, copper, carbon nanotubes or composite thereof. The conductor 11 may be in the form of a solid bar or a bundle of wires, preferably stranded.

In the cable of the disclosure, the core may include a single conductor or preferably a plurality of conductors.

Each conductor (in the case of FIG. 1, the single conductor 11) of the cable of the disclosure is electrically insulated by an insulating layer 12 in form of an extruded polymeric coating having flame-retardant properties. In an embodiment, the insulating layer is extruded in direct contact with the conductor.

An outer jacket 13, in extruded polymeric material such as polyethylene, may be provided to surround the insulating layer 12 and in direct contact thereof.

According to the present disclosure, the cable insulating layer is made from a polyolefin-based composition comprising a cross-linked polyolefin as base polymer.

The cross-linked polyolefin of the polyolefin-based composition for the cable insulating layer of the disclosure can be a polyethylene homopolymer such as low-density polyethylene (LDPE) or very low density polyethylenes (VLDPE), or a polyethylene copolymer such as linear low-density polyethylene (LLDPE), ethylene propylene rubber (EPR) or ethylene propylene diene monomer rubber (EPDM).

The base polymer can be cross-linked by a silane-based crosslinking agent, such as a vinyl silane and/or by a peroxide, such as dibutyl-peroxide.

According to an embodiment of the present disclosure, the polyolefin-based composition includes 5-10 wt % of silica and 0.5-2 wt % of carbon nanotubes, the percentage being referred to the weight of the polyolefin-based composition.

A polyolefin-based composition having the above combination of fillers in the respective amount ranges specified above has been surprisingly found to provide an electrically insulating coating with improved flame-retardant properties, particularly a reduced or no dripping during burning, without substantially impairing its dielectric and mechanical properties.

In an embodiment, the silica (a.k.a. silicon dioxide) of the polyolefin-based composition for the cable insulating layer of the disclosure is amorphous silica. In another embodiment, the silica is a powder material in which the particles have a substantially spherical shape. The use of a silica being amorphous and/or made of substantially spherical particles makes the extrusion of the polyolefin-based easier.

In an embodiment, the median diameter (D50) of the silica spherical particles is within the range 100-200 nm. The specific surface area (as measured by BET method) can be within a range 10-30 m$^2$/g.

In the present description and claims, the term "carbon nanotube" means any allotrope form of carbon with a cylindrical nanostructure.

Carbon nanotubes are members of the fullerene structural family and are categorized as single-walled nanotubes (SWCNTs) and multi-walled nanotubes (MWCTNs).

In an embodiment, the carbon nanotube of the polyolefin-based composition for the cable insulating layer of the disclosure is MWCNT.

With respect to SWCNTs, MWCNTs show a better fire resistance and a lower influence on the dielectric performance of the composition.

According to the present disclosure, the polyolefin-based composition for the cable insulating layer of the disclosure comprises carbon nanotubes in an amount up to 2 wt % of the polyolefin-based composition. When the amount of carbon nanotubes exceeds such amount, the insulating properties of the resulting insulating coating may be worsened to an unacceptable extent due to the intrinsic electrical conductivity of carbon nanotubes.

According to another embodiment, the polyolefin-based composition for the cable insulating layer of the disclosure further includes talc (a.k.a. hydrated magnesium silicate, $Mg_3Si_4O_{10}(OH)_2$).

Talc can be added in an amount of from 2.5 wt % to 5 wt % with respect to the weight of the polyolefin-based composition. Talc helps in providing an insulating layer with smooth surface after extrusion. Also, the Applicant perceived that talc can play a role in improving the flame retardant properties of the polyolefin-based composition.

In an embodiment, the total amount of talc plus silica is up to 10 wt % with respect to the weight of the polyolefin-based composition.

In another embodiment, the polyolefin-based composition for the cable insulating layer of the disclosure further comprises talc and graphene.

In the present description and claims, the term "graphene" means any allotrope form of carbon made of a single layer of carbon atoms arranged in a hexagonal lattice. It can be in the form of nanoribbons, nanoplatelets, and nano-onions.

Graphene can be added in an amount up to 0.2 wt % with respect to the weight of the polyolefin-based composition.

In an embodiment, graphene is used in the form of platelets. In particular, graphene nanoplatelets can have an average thickness of 5-10 nm (nanometers) and varying size up to 50 μm.

The Applicant experienced that if only silica is used as filler of a polyolefin-based composition for a cable insulating layer, the resulting insulating coating does not show any significant reduction of the dripping under fire. On the other side, in the absence of silica, carbon nanotubes, as the only filler or in combination with talc and/or graphene in a polyolefin-based composition for a cable insulating layer, provided insulating coating with few or no dripping under fire, but no cohesive char and, in addition, the coating had poor mechanical properties and a dielectric constant unsuitable for the use as insulating layer.

The production of the cable according to the disclosure can be carried out by conventional techniques which involves making a cross-linkable polyolefin composition including the fillers and other additives, such as a crosslinking agent, into an extruder. The resulting composition is then extruded and cross-linked. In the case of silane crosslinking, the step can be carried out in a water bath, steam chamber, or at ambient conditions (ambient moisture).

The electric cable of the present disclosure can be used for transporting electrical energy or data. In an embodiment, the cable of the present disclosure is for transporting low-voltage (LV) electrical currents, i.e. electrical currents at a voltage equal to or lower than 1 KV.

The present disclosure will now be described with reference to the following examples which are provided for purpose of illustration only and thus are not to be construed as limiting the scope of the present disclosure in any way.

Example 1

Preparation of Test Samples of Cables According to the Disclosure and Comparative Cables.

Test samples of cables according to the disclosure and comparative cable (hereinafter referred to as Cables A to G) were prepared using an insulating coating comprising, respectively, the fillers and their amounts according to the present disclosure and not.

The insulating coatings of test cables were obtained by processing and curing cross-linkable compositions based on LLDPE copolymer containing hexene-1 as comonomer, a crosslinking system comprising vinyl trimethoxy and tert-butyl-cumyl peroxide, and one or more fillers as indicated in Table 1.

The flame-retardant fillers used in the compositions were:
1) a spherically-shaped amorphous non-reinforcing silicon dioxide with an average primary particle size of 150 nm, (specific surface area, 20 $m^2/g$);
2) talc (hydrated magnesium silicate), with an average primary particle size of 1.9 lam (talc 94%, Specific surface area, 15 $m^2/g$);
3) Multiwalled Carbon Nanotubes (10-15 nm diameter, 0.1-10 μm length)
4) Graphene (10 μm lateral, 4 nm thickness) on polymeric carrier.

An additional additive consisting of a LDPE masterbatch containing a tin catalyst was also included in the cross-linkable compositions.

Table 1 below reports the amounts of LLDPE base polymer, crosslinking system and fillers included in the cross-linkable compositions used for making the insulating coating of each of the Cables A to G, where the comparative cables are marked by an asterisk.

The amounts are given in grams and, in the case of the fillers, the wt % is given in parenthesis.

TABLE 1

| Component | A | B* | C | D | E | F* | G* |
|---|---|---|---|---|---|---|---|
| LLDPE | 1829.6 | 1689.6 | 1794.6 | 1759.6 | 1757.0 | 1757.0 | 2799.6 |
| Crosslinking system | 53.05 | 53.05 | 53.05 | 53.05 | 53.05 | 53.05 | 53.05 |
| Silica | 1200.0 (10 wt %) | 1200.0 (10 wt %) | 1200.0 (10 wt %) | 1200.0 (10 wt %) | 600.0 (5 wt %) | 1200.0 (10 wt %) | — |
| Carbon nanotubes | 100.0 (1 wt %) | 300.0 (3 wt %) | 150.0 (1.5 wt %) | 200.0 (2 wt %) | 200.0 (2 wt %) | 200.0 (2 wt %) | — |
| Talc | — | — | — | — | 600.0 (5 wt %) | — | — |
| Graphene | — | — | — | — | 8.6 (0.2 wt %) | 8.6 (0.2 wt %) | — |

The cross-linkable compositions were extruded with the setup reported in the following Table 2 onto respective electric conductor cores and then cured to form the insulation layers of the Cables A to G.

TABLE 2

| | | | |
|---|---|---|---|
| Screw (° C.) | Neutral | Screw type | PE-LSZH |
| Socket (° C.) | Not cooled | Conductor | Single wire red copper 1.37 mm |
| Zone 1 (° C.) | 160 | Filters | No filtration |
| Zone 2 (° C.) | 170 | Wire cooling | Cold water |
| Zone 3 (° C.) | 190 | Male (mm) | 1.50 |
| Zone 4 (° C.) | 210 | Female (mm) | 2.90 |
| Head (° C.) | 230 | Final diameter (mm) | 3.00 |
| Female (° C.) | 270 | Extruded m | 15 + 15 + 30 |

Example 2

Tests on Occurrence and Persistence of Droplets Under Fire Conditions, Mechanical and Dielectric Properties.

Test samples of the cables obtained according to Example 1 were subjected to tests for their dripping behaviour as well as their mechanical and dielectric properties.

The occurrence and persistence of droplets under fire conditions were evaluated. The set-up used for the tests under fire conditions was substantially that specified in the standard EN 50399:2011/A1 (2016) and IEC 61034-2 (2005), which, according to the Table 4 of the Commission Delegated Regulation (EU) 2016/364 of 1 Jul. 2015, allows to determine, inter alia, occurrence and persistence of flaming droplets. Particularly, horizontal burning and/or the more challenging vertical burning were performed on the tested samples in accordance with the above European standard. Prior to testing, each test sample was conditioned for 21 days at room temperature (25° C.) and at a relative moisture of 50%.

The mechanical properties were evaluated by measuring the following parameters:
Tensile Strength (T.S.) in Mpa (values >8.5 are regarded as acceptable);

Elongation at break (E.B.) in % (values >200% are regarded as acceptable);

Modulus @ 150% in Mpa (values >4.5 are regarded as acceptable);

Maximum Elongation under load in % @ 250° C. (<100% Hot Set at 250° C. according to the standard CEI EN 50363 ed. 5 G7);

Maximum Elongation after unloading in % @ 250° C. (<10% Hot Set at 250° C. according to the standard CEI EN 50363 ed. 5 G7 (2006);

For the evaluation of the above mechanical parameters, each sample was conditioned for 16 hours at 80° C. and at a relative moisture of 80%.

The extrusion behaviour of the test samples obtained according to Example 1 was also evaluated and is indicated as OK when the surface of the extruded insulating layer was satisfactorily smooth, or NO when it was so "rough" as to provide potential discontinuities at the interface with the cable jacket to be extruded thereupon, and X when it could be improved with extrusion tricks known to the skilled person.

The dielectric properties were evaluated by measuring electrical conductivity according to the standard CEI 20-34 (2001). Based on the results obtained, the dielectric properties are said as OK when suitable for an insulating layer for low voltage cable (acceptable/good) or NO when not.

The results of the tests are shown in the following Table 3.

The increase of the amount of carbon nanotubes seem to result in a cable having reduced dripping but with not totally satisfactory compliant mechanical properties (Max. Elong. under load %@250° C.) and questionable extrusion behaviour (cable D). It is possible that these drawbacks are due to inaccuracy in the extrusion process and/or in the mechanical evaluation, because a further increase of the amount of carbon nanotubes to values higher the upper end of the carbon nanotubes range provided by the present resulted in a cable with suitable mechanical properties and extrusion behaviour (comparative cable B). What is not acceptable in comparative cable B are the dielectric properties.

The presence of talc in partial replacement for silica and the presence of graphene as additional fillers in amounts within the respective ranges provided by the present disclosure results in a polyolefin-based composition for cable insulating layers having mechanical and dielectric properties that are both compliant for the intended use and, at the same, and exhibiting few dripping (Cable E according to the disclosure). Particularly, the observed few occurrence and persistence of flaming droplets is such that Cable E according to the disclosure could be advantageously qualified as d1 according to the European standard EN 50399 (if the other cable layers have a similar or better dripping performance). Thus, the tested cable qualified to be suitable for areas with very high fire risks.

If only graphene is present as additional filler as in comparative Cable F, the dripping behaviour strongly wors-

TABLE 3

| | Cable | | | | | | |
|---|---|---|---|---|---|---|---|
| | A | B* | C | D | E | F* | G* |
| Extrusion Behaviour | OK | OK | OK | X | OK | OK | OK |
| Horizontal Burning | Few drops | No drops | No drops | No drops | — | — | Drops heavily |
| Vertical Burning | Few drops | No drops | Few drops | Few drops | No drops | Heavy dripping | Heavy dripping |
| T.S. (Mpa) | 18.0 | 13.0 | 14.6 | 15.1 | 18.1 | 16.6 | 23.2 |
| E.B. (%) | 454 | 334 | 392 | 441 | 373 | 360 | 578 |
| Modulus @ 150% (Mpa) | 11.7 | 10.8 | 10.8 | 10.8 | 13.5 | 13.6 | 10.9 |
| Max. Elong. under load % @ 250° C. | 75 | 65 | 90 | 130 | 50 | 35 | 60 |
| Max. Elong. after unloading % @ 250° C. | 5 | 0 | 5 | 5 | 0 | 0 | 5 |
| Dielectric | OK | NO | OK | OK | OK | OK | OK |

From the above results, comparative cable G—which has an insulating coating without fillers—shows mechanical and dielectric properties compliant for the intended use, but at the same time exhibits heavy dripping such that a cable comprising this insulation could be qualified as d2 according to the European standard EN 50399 at best (if the other cable layers have no worse dripping performance).

The presence of silica and carbon nanotubes as fillers in amounts within the respective ranges provided by the present disclosure results in polyolefin-based composition for cable insulating layers provided mechanical and dielectric properties which are both compliant for the intended use and, at the same, exhibiting few dripping (Cable A and C according to the disclosure). Particularly, the observed few occurrence and persistence of flaming droplets is such that cables A and C according to the disclosure could be advantageously qualified as d1 according to the European standard EN 50399 (if the other cable layers have a similar or better dripping performance). Thus, both the tested cables qualified to be suitable for areas with very high fire risks.

ens such that the cable could be qualified only as d2 according to the European standard EN 50399 at best (if the other cable layers have no worse dripping performance).

The invention claimed is:

1. A flame-retardant electric cable having a core comprising an electric conductor and an electrically insulating layer made from a flame-retardant polyolefin-based composition comprising:
   a) a cross-linked polyolefin as base polymer;
   b) silica; and
   c) carbon nanotubes,
   wherein an amount of the silica is from 5 wt % to 10 wt % of a weight of the polyolefin-based composition, and an amount of carbon nanotubes is from 0.5 wt % to 2 wt % of the weight of the polyolefin-based composition.

2. The flame-retardant electric cable according to claim 1, wherein the cross-linked polyolefin is selected from the group consisting of a polyethylene homopolymer and a polyethylene copolymer.

3. The flame-retardant electric cable according to claim 1, wherein the silica is an amorphous silica.

4. The flame-retardant electric cable according to claim 1, wherein the silica is a powder material comprising particles having a substantially spherical shape.

5. The flame-retardant electric cable according to claim 1, wherein the carbon nanotubes are multi-walled nanotubes.

6. The flame-retardant electric cable according to claim 1, wherein the polyolefin-based composition further comprises talc.

7. The flame-retardant electric cable according to claim 6, wherein a total amount of the talc and the silica is up to 10 wt % with respect to the weight of the polyolefin-based composition.

8. The flame-retardant electric cable according to claim 6, wherein the polyolefin-based composition further comprises graphene.

9. The flame-retardant electric cable according to claim 8, wherein an amount of the graphene in the flame-retardant polyolefin-based composition is up to 0.2 wt % with respect to the weight of the polyolefin-based composition.

10. The flame-retardant electric cable according to claim 8, wherein the graphene is in the form of platelets.

11. The flame-retardant electric cable according to claim 3, wherein the silica is a powder material comprising particles having a substantially spherical shape.

* * * * *